United States Patent Office 3,594,439
Patented July 20, 1971

3,594,439
ACCELERATORS FOR POLYESTER RESINS
John G. Baker, Cheswick, Pa., assignor to
PPG Industries, Inc., Pittsburgh, Pa.
No Drawing. Filed Dec. 22, 1967, Ser. No. 692,657
Int. Cl. C08f 21/02
U.S. Cl. 260—863
17 Claims

ABSTRACT OF THE DISCLOSURE

Polyester resin compositions comprising polyesters of ethylenically unsaturated polycarboxylic acids and polyhydric alcohols and accelerators for the peroxide cure of the polyesters are treated with from about 0.001 to about 0.9 weight percent of the resin of free alkylene glycol having up to 6 carbon atoms to accelerate the gel time of the polyesters. The cured polyester compositions are useful as coatings, castings and laminates.

---

Unsaturated polyester resins have extensive commercial utility, and it is frequently desired to effect the cure of such resins in the fastest times possible for economic purposes. Some difficulties which have generally hindered the manufacture of satisfactory unsaturated polyester resins have been that the cure is uneconomically long and that the resins are cured in the presence of large amounts of accelerators which produce undesirable colors in the final product.

It has been widely recognized that mixtures of the polyesters above described and cross-linking soluble monomers undergo interpolymerization reactions to form infusible, insoluble, thermoset addition products even at moderate temperatures and in the absence of substantial pressure. These interpolymerizable mixtures lend themselves quite effectively to the formation of castings and can be employed to coat or to impregnate preforms and fabrics of fibrous reinforcing materials such as glass fibers, asbestos, and many other materials.

Indeed, such interpolymerizable mixtures are so highly reactive and form polymer products so rapidly that the mixtures cannot be stored for any appreciable period of time without a strong tendency for them to undergo premature gelation and setting. This is especially true where the mixtures are subjected to somewhat elevated temperatures. Since mixing of the polyester and the monomer is often conducted with the polyester heated to impart fluidity thereto, there is danger of gelation even while the monomer is being mixed with the polyester.

In order to obviate these difficulties, it was early proposed to incorporate into the components of the interpolymerizable mixture substances termed inhibitors, which exhibited a strong tendency to retard or hold back the interpolymerization reaction, especially at moderate temperatures involved in the preparation of the mixtures, or in the storage of the latter after preparation. Among the materials so proposed for use as gelation inhibitors were the quinones and hydroquinones; also, catechols and substituted catechols such as tertiary-butyl catechol were often used.

These quinonic or phenolic types of inhibitors were persistent and powerful inhibitors; in fact, they continued to exert a very strong retarding effect on interpolymerization even after the free radical initiators such as cumene hydroperoxide, or tertiary-butyl hydroperoxide were incorporated, and until the temperature of the polymerizable mixture was raised to a relatively high level. These persistent retarding effects were often highly undesirable, especially in the use of the interpolymerizable mixtures in casting operations. In mixtures containing these inhibitors alone, exothermal temperature was often excessive and cracked or discolored products resulted.

It has, therefore, become common to add accelerators to the inhibited polyester compositions to cure the compositions reasonably fast upon the addition of the catalyst while allowing the compositions to remain stable even at high temperatures prior to the addition of the catalyst. The conventional accelerators used for promoting the cure of low temperature, unsaturated polyester resins are metallic such as cobalt salts. While these accelerators have generally accelerated the cure of unsaturated polyester resins in a reasonably satisfactory manner, their use has contributed an undesirable color to the finished article. It is well known that many of the metallic accelerators color the polyester resins. Cobalt naphthenate, for example, colors the resin purple red.

It has now been discovered that the addition of small amounts of free alkylene glycol having up to 6 carbon atoms to the resin compositions having a common amount of standard accelerator greatly reduces the gel time at room temperature. This result is surprising especially since the addition of somewhat larger amounts of alkylene glycol to the resin compositions inhibits the gel time of the resin after the catalyst has been added. The addition of glycol would thus require less metallic accelerator to obtain a similar gel time resulting in a better color of the cured product.

The polyester compositions of this invention are comprised of polyesters of ethylenically unsaturated polycarboxylic acids and polyhydric alcohols, polymerizable ethylenically unsaturated compounds, accelerators, and from 0.001 to 0.9 percent of alkylene glycol containing up to 6 carbon atoms. Preferably, the composition also contains an inhibitor.

As set forth above, the novel accelerator system of this invention promotes the curing of free-radical catalyzed unsaturated polyester resins which are polymerizable mixtures of (a) a polyester of an ethylenically unsaturated polycarboxylic acid and a polyhydric alcohol and (b) a monomer containing a vinyl group. The ethylenically unsaturated polycarboxylic acids include such acids as: maleic acid, fumaric acid, aconitic acid, mesaconic acid, citraconic acid, itaconic acid, and halo and alkyl derivatives of such acids and the like; the preferred acid being maleic acid. The anhydrides of these acids, where the anhydrides exist are, of course, embraced under the term "acid," since the polyesters obtained therefrom are essentially the same whether the acid or anhydride is utilized in the reaction. The ethylenically unsaturated dicarboxylic acids are conventionally employed in an amount of about 10 mole percent to about 100 mole percent, and preferably in an amount of about 20 mole percent to about 80 mole percent, of the total moles of acid component in the polyester.

Saturated dicarboxylic acids may be utilized in combination with the unsaturated acid or anhydride in the preparation of unsaturated polyester resins. Such acids increase the length of the polyester without adding additional cross-linking sites, which is a desired feature in some polyesters. Examples of useful dicarboxylic acids which are either saturated or only aromatically unsaturated include:

succinic acid
adipic acid
suberic acid azelaic acid
sebacic acid
phthalic acid
isophthalic acid
terephthalic acid
tetrachlorophthalic acid
hexachloroendomethylenetetrahydrophthalic acid and the like. As in the case of the ethylenically unsaturated acids, the anhydrides of these acids, where the anhydrides exist, are embraced in the term "acid." Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatic dicarboxylic acids. Such "saturated carboxylic acids" may also be referred to as "non-olefinically unsaturated" polycarboxylic acids.

The polyhydric alcohols useful in preparing unsaturated polyester resins include:

| | |
|---|---|
| ethylene glycol | polypropylene glycol |
| diethylene glycol | glycerol |
| triethylene glycol | neopentyl glycol |
| polyethylene glycol | pentaerythritol |
| propylene glycol | trimethylol propane |
| dipropylene glycol | trimethylol ethane | and the like. The preferred polyols for the purpose of this invention have a molecular weight of less than about 2,000 and consist essentially of carbon, hydrogen and oxygen. The polyhydric alcohols are generally employed in an equal molar ratio to the total acid components, or as a slight excess, as, for example, about 5 mole percent excess.

Polymerizable ethylenically unsaturated compounds which cross-link with unsaturated polyesters to form thermosetting materials include such monomers as:

| | |
|---|---|
| styrene | methyl acrylate |
| alpha-methyl styrene | methyl methacrylate |
| divinyl benzene | hexyl acrylate |
| vinyl acetate | octyl acrylate |
| allyl acetate | octyl methacrylate |
| diallyl phthalate | diallyl itaconate |
| diallyl succinate | diallyl maleate |
| diallyl adipate | diallyl fumarate |
| diallyl sebacate | triallyl cyanurate | and the like. The preferred monomers are liquid compounds, soluble in the polyester components. Such monomers should preferably be free of non-aromatic carbon-carbon conjugated double bonds.

The monomer component or components may be employed over a broad range, but usually the proportion thereof, upon a weight basis, will be less than the polyester component. The amount of monomer is generally sufficient to provide a liquid, flowable, interpolymerizable mixture. Ordinarily, the percentage of monomer will fall within the range of about 10 percent to about 60 percent of the total weight of polyester and monomer. At the preferred range, the monomer is present in an amount of about 20 percent to about 50 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100° C. to about 120° C., which is sufficiently high, in the absence of gelation inhibitors, to induce premature gelation upon introduction of the monomer into the system. This is true even in the absence of free-radical catalysts.

Accordingly, it is preferred to include a gelation inhibitor in one or both components of the mixture. Suitable inhibitors may be selected from the quinonic or phenolic class or from a group of quaternary ammonium salts and amine salts, especially amine halide salts. Suitable inhibitors of the quinonic or phenolic class include:

| | |
|---|---|
| p-benzoquinone | 4-t-butyl catechol |
| chloranil | 3-methyl catechol |
| hydroquinone | 4-ethyl catechol |
| 3-isopropyl catechol | 4-isopropyl catechol |

The following are representative examples of halide salts of amines which may be employed as inhibitors:

trimethylamine hydrochloride
triethylamine hydrobromide
dimethylaniline hydrochloride
triethylamine hydrochloride
tri-n-butylamine hydrochloride
tribenzylamine hydrobromide
N-benzylaniline hydrochloride
and the like.

Useful quaternary ammonium salts include:

trimethyl benzyl ammonium acid oxalate
trimethyl benzyl ammonium chloride
di(trimethyl benzyl ammonium) oxalate
trimethyl benzyl ammonium maleate
trimethyl benzyl ammonium tartrate and the like. Other useful ammonium compounds and amine halide compounds are disclosed in U.S. Pats. 2,593,787 and 2,646,416, respectively.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conveniently is in a range of about 0.001 percent to about 0.1 percent by weight, based upon the polyester component of the mixture. Interpolymerizable mixtures of polyesters of ethylenically unsaturated dicarboxylic acids and monomers containing an inhibitor, as above described, may be stored over substantial periods of time, for example, several weeks or even months, without premature gelation.

The accelerator used in this invention in conjunction with the free alkylene glycol may be any of the standard accelerators for room temperature polyester resin cure. A number of such accelerators are described in the book Polyesters and Their Applications by Bjorksten, Reinhold Publishing Corp. (1956), see especially page 66. Generally the accelerators used for this purpose are salts of cobalt, copper, vanadium, and alkaline earth metals. The preferred salts of the various metals are salts prepared from organic carboxylic acids, especially acids containing less than 20 carbon atoms and particularly monocarboxylic acids, inasmuch as said salts ordinarily have the greatest solubility in unsaturated polyester resins. However, inorganic salts of such metals may be utilized where such inorganic salts have sufficient solubility in the unsaturated polyester resins to be effectively dissolved or dispersed therein. The preferred alkaline earth metals are calcium and barium, although salts of the other metals of Group II-A of the Periodic Table, including beryllium, magnesium, strontium, barium and radium, and other well known accelerators such as antimony compounds may also be utilized.

In the practice of this invention, the following salts of cobalt, copper and alkaline earth metals are exemplary of those useful:

| | |
|---|---|
| cobalt acetate | calcium propionate |
| cobalt butyrate | calcium naphthenate |
| cobalt benzoate | barium acetate |
| cobalt capronate | barium butyrate |
| cobalt laurate | barium benzoate |
| cobalt palmitate | barium capronate |
| cobalt octoate | barium laurate |
| cobalt propionate | barium palmitate |
| cobalt naphthenate | barium octoate | cobalt stearate
copper acetate
copper butyrate
copper benzoate
copper capronate
copper laurate
copper palmitate
copper octoate
copper propionate
copper naphthenate
calcium acetate
calcium butyrate
calcium benzoate
calcium capronate
calcium laurate
calcium palmitate
calcium octoate barium propionate
barium naphthenate
magnesium acetate
magnesium benzoate
magnesium laurate
magnesium octoate
magnesium naphthenate
beryllium butyrate
beryllium capronate
beryllium palmitate
beryllium propionate
strontium acetate
strontium butyrate
strontium benzoate
strontium octoate
strontium naphthenate and the like. Although the above salts are derived from monocarboxylic acids, useful salts may be formed from the above cations and anions derived from polycarboxylic acids, especially dicarboxylic acids, including the following acids:

adipic acid
citraconic acid
fumaric acid
maleic acid
oxalic acid
succinic acid
and the like.

Also operative in this invention are inorganic acid salts of cobalt and the alkaline earth metals of Group II-A, particularly where such salts are sufficiently soluble in polyester resins, as for example, salts such as hydroxides, chlorides, bromides, sulfates and the like.

The anion portion of the salts of copper, cobalt and alkaline earth metals have minimal, if any, effect upon the accelerator characteristics of the novel accelerator system described herein. The anion portion of salt does, however, contribute solubility of the metal; thus, the anion portion of these salts is preferably any radical, organic or inorganic, which promotes the solubility of the metal in the unsaturated polyester resin. As noted above, the preferred anion is derived from organic carboxylic acids.

The standard accelerator may constitute from approximately 0.001 to 0.2 weight percent of the total polyester resin composition, the amount being based on the amount of metal in the accelerator. For example, cobalt octoate comprising 12 percent actual cobalt metal used in the amount of 0.2 percent of the total polyester would be calculated as 0.024 percent accelerator. The standard accelerator is generally added before the catalyst (free radical initiator) but may be added after the addition of the catalyst.

The free alkylene glycol used may be any alkylene glycol having up to 6 carbon atoms. Examples are: ethylene glycol, propylene glycol, diethylene glycol, 1,6-hexanediol, neopentyl glycol, and the like. Ethylene glycol and propylene glycol are the preferred embodiments of this invention.

The alkylene glycol must be added in free form, that is, the use of excess alkylene glycol as one of the components of the polyhydric alcohol in the polyester formation is not effective to accelerate the gel time of the polyester. The alkylene glycol is added after the polyester is formed.

The proportion of free alkylene glycol added is critical to this invention. As previously mentioned, a moderate amount of free alkylene glycol will inhibit rather than accelerate the gel time of the polyester resin. It has been found that a polyester resin will gel faster when the added free alkylene glycol consistutes from 0.001 percent to 0.9 weight percent of the total polyester resin. In the preferred embodiment of this invention, the free alkylene glycol constitutes from 0.1 percent to 0.8 weight percent of the polyester resin.

It has been found that any small amount of free alkylene glycol will aid in the acceleration of the polyester resin up to about 0.9 percent by weight of the resin. The addition of free alkylene glycol in amounts less than 0.001 percent aid in the acceleration to a limited degree, while the addition of 0.1 to 0.8 percent of the free alkylene glycol considerably shortens the gel time of the resin and up to about 0.9 percent free alkylene glycol will aid in the acceleration of the gel to a lesser degree.

When the composition contains the polyester, the crosslinking ethylenically unsaturated monomer, the inhibitor, the accelerator, and the free alkylene glycol, it is necessary only to add a polymerization catalyst in order to quickly cure the resin. The catalyst is a free radical initiator and any known free radical initiator may be used (see Polyesters and Their Applications by Bjorksten, Reinhold Publishing Corp. (1956), pages 48 to 51). The preferred catalyst is an organic peroxide, an organic hydroperoxide, or an ester thereof, and is activated by the accelerator. Typical organic peroxides useful as catalysts for unsaturated polyester resins include:

benzoyl peroxide
acetyl peroxide
lauroyl peroxide
methyl ethyl ketone peroxide
cyclohexanone peroxide and the like.

Organic hydroperoxides or their esters with carboxylic acids useful as catalysts for unsaturated polyester resins include:

cumene hydroperoxide
tertiary butyl hydroperoxide
ditertiary butyl perphthalate
1-hydroxycyclohexyl hydroperoxide and the like. For the purposes of this invention, ketone peroxides represent a preferred class of catalysts, and best results have been obtained with methyl ethyl ketone peroxide.

Many other useful catalysts are disclosed in the monograph Organic Peroxides by A. V. Tovolsky and R. B. Mesrobian, copyrighted in 1954 by Interscience Publishers, Inc., New York, pages 158-163.

These catalysts may be utilized in amounts of about 0.1 percent to about 5 percent by weight based upon the mixture of interpolymerizable materials. Naturally, the amount of the organic peroxide catalyst applicable in the practice of the invention will vary with the activity of the particular accelerator and with the amount of inhibitor present in the interpolymerizable mixture.

The unsaturated polyester resin composition is formed by esterifying an ethylenically unsaturated polycarboxylic acid and a glycol, adding an inhibitor and mixing an ethylenically unsaturated compound with the hot polyester. The accelerator and alkylene glycol are generally added at room temperature at the time of resin manufacture and the composition stored until ready to be used. At that time, the catalyst is added and the composition cures very quickly. If desired, the catalyst may be added prior to the accelerator and alkylene glycol if the resin is to be utilized without being subjected to prolonged storage.

The instant invention permits the preparation of substantially clear thermoset polyester articles in a minimum of time at room temperature. As noted above, polyester resins cured at elevated temperatures tend to discolor while resins polymerized at low temperatures tend to cure very slowly unless the common accelerator is present. However, the common accelerators discolor the resins unless utilized in small amounts in the manner of the instant invention.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise specified.

EXAMPLE 1

This example illustrates the gelation of an interpolymerizable mixture of an ethylenically unsaturated polyester and a monomer which has been stabilized with methyl hydroquinone and 2,4-dinitrolphenol with the use of a cobalt octoate accelerator and a small amount of free alkylene glycol.

A polyester resin was obtained by condensation of 6 moles of phthalic anhydride, 4 moles of maleic anhydride, and 10.8 moles of propylene glycol. Sixty-five parts of this polyester were mixed with 35 parts of styrene and the mixture was stabilized against premature gelation by the incorporation of 0.005 part of methyl hydroquinone and 0.012 part of 2,4-dinitrolphenol, 0.05 part of hydrocarbon wax was added and 0.2 part of cobalt octoate having a cobalt content of 12 percent was added as an accelerator. The mixture was then divided into two parts.

The first part was gelled by adding 0.5 part of methyl ethyl ketone peroxide as a catalyst. The gel time was 18 minutes and 50 seconds.

The second part was mixed with 0.1 part propylene glycol and then gelled by adding 0.5 part of methyl ethyl ketone peroxide as a catalyst. The gel time was 13 minutes and 12 seconds.

This shows the marked improvement in gel time by using small amounts of free alkylene glycol with the accelerator.

EXAMPLES 2 TO 19

These examples illustrate comparative gel times of different polyester resins when treated with standard cobalt octoate accelerator alone and when treated with varying amounts of free propylene glycol and free methylene glycol along with the cobalt octoate accelerator. The effectiveness of the alkylene glycol is also shown using varying amounts of standard accelerator.

Sixty-five parts of two polyester resins were mixed with 35 parts of styrene, 0.013 part of methyl hydroquinone, 0.05 part wax and 0.02 part of cobalt octoate having a 12 percent cobalt content. These compositions were compared with and without varying amounts of alkylene glycol using 0.5 percent methyl ethyl ketone peroxide as the catalyst. The results of the gel times are tabulated below in Table I:

TABLE I

| Example | Polyester | Alkylene glycol added | Percent alkylene glycol added | Gel time at 77° F. (min.) |
|---|---|---|---|---|
| Control 1 | A[1] | | | 18.17 |
| 2 | A | Propylene glycol | 0.1 | 16.42 |
| 3 | A | do | 0.02 | 17.33 |
| 4 | A | do | 1.0 | 30.33 |
| 5 | A | do | 2.0 | 70.00 |
| 6 | A | do | 5.0 | 238.00 |
| 7 | A | Ethylene glycol | 0.1 | 17.50 |
| 8 | A | do | 1.0 | 31.08 |
| Control 2 | B[2] | | | 24.67 |
| 9 | B | Propylene glycol | 0.02 | 22.42 |
| 10 | B | do | 0.10 | 16.83 |
| 11 | B | do | 1.0 | 27.83 |
| 12 | B | do | 2.0 | 71.75 |
| 13 | B | do | 5.0 | 270.00 |
| 14 | B | Ethylene glycol | 0.1 | 17.00 |
| 15 | B | do | 1.0 | 28.17 |

[1] Polyester of 6.0 moles phthalic anhydride, 4.0 moles maleic anhydride, 8.2 moles propylene glycol and 2.8 moles diethylene glycol.
[2] Polyester of 6.0 moles phthalic anhydride, 4.0 moles maleic anhydride and 10.8 moles propylene glycol.

The above table illustrates the decrease in gel time when small amounts of ethylene glycol or propylene glycol were added.

The polyester composition formed from polyester B was mixed with 0.1 part of propylene glycol and gelled using varying amounts of cobalt octoate (12 percent cobalt) accelerator and varying amounts of methyl ethyl ketone peroxide catalyst and compared to untreated samples. The results are tabulated below in Table II.

TABLE II

| Example | Propylene glycol | Cobalt octoate | Methyl ethyl ketone peroxide | Gel time at 77° F. (min.) |
|---|---|---|---|---|
| Control 3 | | 0.02 | 2.0 | 42.00 |
| 16 | 0.1 | 0.02 | 2.0 | 28.42 |
| Control 4 | | 0.05 | 2.0 | 10.83 |
| 17 | 0.1 | 0.05 | 2.0 | 9.50 |
| Control 5 | | 0.50 | 0.3 | 39.45 |
| 18 | 0.1 | 0.50 | 0.3 | 25.50 |

The above examples show that the polyester resin compositions containing free alkylene glycol gel faster using different proportions of standard accelerator and catalyst.

EXAMPLES 20 AND 21

The following examples show the utility of adding free alkylene glycol to polyester compositions containing a trivalent antimony compound and manganese napthenate as the accelerators.

Sixty-five parts of a polyester resin comprised of 6 moles of phthalic anhydride, 4 moles of maleic anhydride, and 10.01 moles of propylene glycol were added to 35 parts of styrene, 0.013 part of methyl hydroquinone and 0.05 part hydrocarbon wax. In Example 20, 100 parts of the above polyester resin composition were mixed with 0.2 part of a trivalent antimony compared (Cosan X–780) as an accelerator and 1 part of methyl ethyl ketone peroxide and the gel time was found to be greater than 72 hours at 77° F.

This was compared to the gel time of 100 parts of the polyester resin composition mixed with 0.2 part of trivalent antimony compound (Cosan X–780) and 0.1 part of propylene glycol and 1 part of methyl ethyl ketone peroxide. The gel time at 77° F. of the resin mixed with free propylene glycol was 72 minutes.

In Example 21, 100 parts of the above polyester resin were added to 0.3 part of manganese naphthenate having a manganese content of 6 percent and 1 part methyl ethyl ketone peroxide and the gel time at 77° F. was 3.5 hours. This was compared to the gel time of the same resin with 0.1 part propylene glycol added. The latter resin gelled in 2.95 hours.

As can be seen from the above examples, the free alkylene glycol can be added to any standard accelerator to achieve a faster gel of a polyester resin.

EXAMPLE 22

A polyester composition consisting of 65 parts of a polyester of 6 moles of phthalic anhydride acid, 4 moles of maleic anhydride acid and 10.01 moles of propylene glycol, 35 parts of styrene, 0.013 part of methyl hydroquinone, 0.5 part of hydrocarbon wax and 0.2 part of cobalt octoate containing 12 percent cobalt was treated with different compounds and gelled with 0.5 part of methyl ethyl ketone peroxide at 77° F. The results of the gel times are tabulated below in Table III:

TABLE III

| Example | Additive | Percent added | Gel time (min.) |
|---|---|---|---|
| Control A | | | 20.98 |
| B | Glycerine | 0.06 | 24.33 |
| C | do | 0.02 | 23.42 |
| D | Polypropylene glycol 425 | 0.04 | 21.87 |
| E | do | 0.10 | 22.45 |
| F | do | 0.30 | 23.28 |
| G | Water | 0.02 | 21.83 |
| 22 | Propylene glycol | 0.10 | 13.62 |

The above example shows that although additions of like amounts of other glycols inhibit the gelling of the polyester resin composition, the preferred alkylene glycol unexpectedly greatly accelerates its gel.

EXAMPLES 23 TO 27

These examples illustrate the effect of varying the amounts of free alkylene glycol on the gel time of the polyester resin composition.

Varying amounts of propylene glycol and 1,6 hexanediol were added to the polyester composition comprising 65 parts of a polyester formed from 6 moles of phthalic anhydride, 4 moles of maleic anhydride and 10 moles of propylene glycol, 35 parts of styrene, 0.013 part of methyl hydroquinone, 0.05 part of hydrocarbon wax and 0.2 part of cobalt octoate containing 12 percent cobalt. The compositions were mixed with 0.5 part of methyl ethyl ketone peroxide at 77° F. and the gel times were compared. The results are listed below in Table IV:

TABLE IV

| Example | Alkylene glycol added | Percent alkylene glycol added | Gel time (min.) |
|---|---|---|---|
| Control H | Propylene glycol | | 26 |
| 23 | do | 0.01 | 22.5 |
| 24 | do | 0.1 | 15.75 |
| 25 | do | 0.5 | 15.20 |
| 26 | do | 0.8 | 18.03 |
| 27 | 1,6 hexanediol | 0.2 | 24.95 |

According to the provisions of the patent statutes, there are described above the invention and what is considered its best embodiments. However, within the scope of the appended claims, it is to be understood that the invention may be practiced otherwise than as specifically described.

What is claimed is:

1. A polymerizable composition comprising:
   (1) a polyester of an ethylenically unsaturated polycarboxylic acid and a polyhydric alcohol,
   (2) an accelerator for the peroxide cure of the polyester at room temperature and
   3. The composition of claim 1 wherein the free alkylene alkylene glycol having up to 6 carbon atoms and
   (4) a liquid, polymerizable, ethylenically unsaturated compound.

2. The composition of claim 1 wherein the free alkylene glycol is propylene glycol.

3. The composition of claim 1 wherein the free alkylene glycol is ethylene glycol.

4. The composition of claim 1 wherein the accelerator is cobalt napthenate.

5. The composition of claim 1 wherein the accelerator is cobalt octoate.

6. The composition of claim 1 wherein the composition contains from 0.001 weight percent to 0.9 weight percent of free alkylene glycol.

7. The composition of claim 1 wherein the composition contains from 0.1 to 0.8 weight percent of free alkylene glycol.

8. A composition comprising:
   (1) a polyester of an ethylenically unsaturated polycarboxylic acid and a polyhydric alcohol,
   (2) a liquid, polymerizable, ethylenically unsaturated compound,
   (3) a polymerization inhibitor, which retards interpolymerization reaction at moderate temperatures,
   (4) an accelerator for the peroxide cure of the polyester at room temperature, and
   (5) up to 0.9 percent by weight of a free alkylene glycol having up to 6 carbon atoms.

9. The composition of claim 8 wherein the liquid polymerizable, ethylenically unsaturated compound is styrene.

10. The composition of claim 8 wherein the polymerization inhibitor is methyl hydroquinone.

11. A method of accelerating the free-radical catalyzed cure of a composition comprising:
    (1) a polyester of an ethylenically unsaturated polycarboxylic acid and a polyhydric alcohol,
    (2) a liquid polymerizable ethylenically unsaturated compound,
    (3) a polymerization inhibitor, which retards interpolymerization reactions at moderate temperatures, and
    (4) an accelerator for the peroxide cure for the polyester at room temperature, which comprises incorporating into said composition up to 0.9 percent by weight of a free alkylene glycol having up to 6 carbon atoms and then adding a peroxide catalyst to cure said composition.

12. The method of claim 11 wherein the liquid polymerizable, ethylenically unsaturated compound is styrene.

13. The method of claim 11 wherein the accelerator for the peroxide cure of the polyester is cobalt naphthenate.

14. The method of claim 11 wherein the accelerator for the peroxide cure of the polyester is cobalt octoate.

15. The method of claim 11 wherein the free alkylene glycol is propylene glycol.

16. The method of claim 11 wherein the free alkylene glycol is ethylene glycol.

17. The method of claim 11 wherein the peroxide catalyst is methyl ethyl ketone peroxide.

References Cited

UNITED STATES PATENTS

| 3,249,574 | 5/1966 | Meyer et al. | 260—863X |
| 3,432,458 | 3/1969 | Kwan et al. | 260—863X |

WILLIAM H. SHORT, Primary Examiner

R. J. KOCH, Assistant Examiner

U.S. Cl. X.R.

260—864, 865, 866, 22, 40

PO-1050
(5/69)

UNITED STATES PATENT OFFICE
CERTIFICATE OF CORRECTION

Patent No. __3,594,439__  Dated __July 20, 1971__

Inventor(s) __John G. Baker__

It is certified that error appears in the above-identified patent and that said Letters Patent are hereby corrected as shown below:

Column 4, line 6, after "4-isopropyl catechol" add -- and the like --.

Column 5, line 68 "consistutes" should be -- constitutes --.

Column 7, line 34 "methylene" should be -- ethylene --.

Column 8, line 68, "21.87" should be -- 21.88 --; line 70, "13.62" should be -- 13.67 --.

Column 9, line 23 "18.03" should be -- 18.05 --; line 24, "24.95" should be -- 24.93 --.

Claim 1, lines 6 and 7 should read -- (3) an amount up to 0.9 percent by weight of a free alkylene glycol having up to 6 carbon atoms and --.

Column 10, line 24, "for", second occurrence, should read -- of --.

Signed and sealed this 14th day of March 1972.

(SEAL)
Attest:

EDWARD M. FLETCHER, JR.
Attesting Officer

ROBERT GOTTSCHALK
Commissioner of Patents